United States Patent [19]
McNulty et al.

[11] Patent Number: 5,112,536
[45] Date of Patent: May 12, 1992

[54] RANDOM PACKING ELEMENT AND METHOD

[75] Inventors: Kenneth J. McNulty, Atkinson, N.H.; Neil Yeoman, Merrick, N.Y.; Chang Li-Hsieh, Carlisle, Mass.

[73] Assignee: Koch Engineering Company, Inc., Wichita, Kans.

[21] Appl. No.: 668,595

[22] Filed: Mar. 13, 1991

[51] Int. Cl.$^5$ ................................................ B01F 3/04
[52] U.S. Cl. ................................ 261/94; 261/DIG. 72
[58] Field of Search ........................... 261/94, DIG. 72

[56] References Cited

U.S. PATENT DOCUMENTS

| | | | |
|---|---|---|---|
| 3,311,356 | 3/1967 | Eckert | 261/94 |
| 4,327,043 | 4/1982 | Leva | 261/94 |
| 4,537,731 | 8/1985 | Billet et al. | 261/94 |
| 4,575,435 | 3/1986 | Kuhl | 261/94 |
| 4,576,763 | 3/1986 | Nutter | 261/94 |
| 4,731,205 | 3/1988 | McNulty | 261/94 |

FOREIGN PATENT DOCUMENTS

| | | | |
|---|---|---|---|
| 1098439 | 3/1981 | Canada | 261/DIG. 72 |
| 2710178 | 9/1978 | France | 261/94 |
| 1304863 | 4/1987 | U.S.S.R. | 261/DIG. 72 |
| 1602183 | 11/1981 | United Kingdom | 261/DIG. 72 |

OTHER PUBLICATIONS

Jager, Chem. Engr. Progress, vol. 85, No. 3, Mar.-1989, p. 111.

Primary Examiner—Tim Miles
Attorney, Agent, or Firm—Richard P. Crowley

[57] ABSTRACT

A saddle-type random packing element for use in a vapor-liquid tower which packing comprises an arcuate body having generally parallel, upright flanges on either side, the arcuate body having a plurality of alternating, generally parallel, inner and outer arched rib elements extending transversely between the flanges. The method of manufacture of the packing element comprises slitting a flat metal sheet to form rib elements, bending the sheet to form the upright flanges, the arched rib elements and then into the arcuate shape of the packing.

28 Claims, 2 Drawing Sheets

RANDOM PACKING ELEMENT AND METHOD

BACKGROUND OF THE INVENTION

Random or dumped packing elements are normally employed in gas-liquid contact towers or columns to provide mass transfer surfaces between a downwardly passing liquid and an upwardly ascending gas or vapor. Random or dumped packing elements may be employed in a variety of chemical and treatment processes, such as rectification, stripping, scrubbing, fractionating, absorbing, separating, washing, extraction or other chemical and treatment-type processes. Generally, the random or dumped packing elements are dumped so as to provide for a random orientation in a vapor-liquid or liquid-liquid contact column. It is desirable that such random or dumped packing elements have a high mass transfer efficiency and good hydraulic capacity.

There are a wide variety of random or dumped packing elements which have been described and used in the prior art including, for example, cylinder-type random packings which have a plurality of slotted walls and internal tongues or projections. A non-arcuate-type tower packing element made of metal and having bulging strips with at least two humps in the strips is described in U.S. Pat. No. 3,311,356, issued Mar. 28, 1967. Other types of random packing elements available include a saddle or arcuate-type random packing elements which are typically made of both plastic and ceramic-type materials, such as chemical stoneware and porcelain or as plastic materials like polypropylene, fluorocarbons, liquid crystal polymers and other moldable resins. Generally, saddle-type packings are arcuate in shape and are commercially available in sizes from about one-half inch to three inches. For example, saddle-type packings may comprise a ceramic material having generally thickened outer ridges and a thickened inner ridge and composed of solid material, while the plastic saddle-type random packings may be composed of a molded resin having an opening in the inner portion of the saddle and with the sides of the saddle serrated or having multiple drip points therein. Typically, the saddle-type elements compose an arcuate portion of a circle, such as generally a half to a third of a torus.

It is desirable to provide for an improved, saddle-type random packing element particularly a metal saddle for use in a gas-liquid contact tower, which saddle-type packing element has improved mass transfer efficiency and good hydraulic capacity.

SUMMARY OF THE INVENTION

The present invention relates to a saddle-type random packing element for use in a gas-liquid contact tower and to a method of manufacturing and using such saddle-type random packing element. In particular, the invention concerns an easily manufactured, metal, saddle-type random packing element of good hydraulic capacity and mass transfer efficiency.

The invention concerns a saddle-type random packing element for use in a vapor-liquid or liquid-liquid contact column, which packing element comprises an arcuate body representing a portion of a torus, for example, one-third to about one-half, and having a first and second generally parallel, spaced apart, radial, upright, longitudinal flange elements on either side of the arcuate body, which flange elements serve to channel liquid along the surface thereof toward each end of the arcuate body. The arcuate body has a plurality of inner and outer transversely arched rib elements extending between the first and second flange elements to define generally arcuate, triangular-shaped, inner and outer spaces within the arcuate body between and below and above the first and second flange elements. The arched rib elements generally extend from the one to the other longitudinal end of the arcuate body with the rib elements alternating between rib elements extending radially outward and radially inward from the one to the other end of the arcuate body and typically with the width of the inner rib elements being the same width or less than the width of the outer rib elements. The number of inner and outer rib elements may vary, and for example, may each range from about 3 to 12.

The saddle-type random packing element may be made from a wide variety of materials, including ceramics and plastics; however, preferably, the saddle-type random packing element may be easily and simply constructed from a metal sheet by forming and bending a flat metal sheet, which metal sheet may comprise for example, carbon steel, stainless steel, aluminum alloys, titanium, nickel alloys and other metals subject to forming and bending. Typically, the saddle-type random packing element of the invention is formed from a single, flat metal sheet material wherein the arched rib elements comprise substantially together with the flange elements the total surface area of the sheet material. In general, the width of the outer arched rib elements, that is, extending radially outward, have a width the same as or up to about 200% greater than the width of the inner rib elements, particularly since as the inner arched rib elements extend toward the radial center of the random packing element, they tend to become crowded, and therefore, inner rib elements of less width are desirable. The random packing element generally has outer arched rib elements at the one and the other longitudinal ends of the arcuate body of the random packing element.

The arched rib elements in one embodiment may have all ribs of the same height and shape or one or more generally alternate rib elements may be formed in other heights or shapes, such as a W-shape or lesser height. The arched rib elements, particularly the outer rib elements, are generally continuous in nature; however, if desired, one or more of the inner or outer arched rib elements may be cut, that is, made discontinuous, and be further extended generally radially downward and inward for inner ribs so as to form drip points with the cut ends thereof. The inner and outer arched rib elements have the arched section in one embodiment generally longitudinally and centrally aligned; however, in other embodiments, the inner or outer, or both, arched rib elements may have the arched section generally longitudinally and alternatingly misaligned from the center of the arcuate body. The saddle-type random packing elements of the invention are typically employed in vapor-liquid or liquid-liquid contact towers or columns by randomly dumping the packing elements onto an internal support within the column.

The saddle-type random packing elements may be easily and effectively manufactured by a variety of techniques. One technique employs a method employing a flat sheet material, such as of metal, like stainless steel, which includes forming, such as by cutting or lancing, a plurality of generally parallel slits of defined width in a generally rectangular, flat sheet material, and which slits terminate short of and generally parallel to the sides of the sheet material and which slits define a plurality of rib elements. The method includes forming the rib elements, such as by employing a die or tool insert, into a plurality of alternating, inner and outer, arched rib elements extending from the plane of the flat sheet. The method also includes forming, such as by bending, a portion of the sides of the flat sheet material into a generally short, upright flange element to create a generally parallel flange element defining a first and second trough for the passage of liquid on either side of the arcuate body. The method then includes also forming, or otherwise bending, the material with the arcuate elements and the upright flanges into a generally arcuate or toroidal shape or saddle-like shape about a defined center. The steps of the method may be performed sequentially in any order.

A great variety of dumped random packings have been suggested and employed in the past. For example, one type of a well-known cylindrical packing is a Pall ring, which when viewed along the axis of rotation presents very little surface area for heat and mass transfer. While viewed perpendicularly to the axis of rotation, the Pall ring presents a very large surface area. This difference creates vapor and liquid channeling through the bed along the paths of least resistance. The metal saddle-type random packing element of the invention has significant projected surface area, both along the axis of rotation and also perpendicular to the axis of rotation. The random packing consists of a finely divided metal structure that is simple and easy to fabricate and employ. The saddle-type random packing element provides for high efficiency and good hydraulic capacity, and thus is eminently suitable for use in a gas-liquid contact column.

The invention will be described for the purposes of illustration only in connection with certain illustrated embodiments; however, it is recognized that various changes, modifications, additions and improvements may be made to the illustrated embodiments by those persons skilled in the art all falling within the spirit and scope of the invention.

DESCRIPTION OF THE EMBODIMENTS

Figure 1:
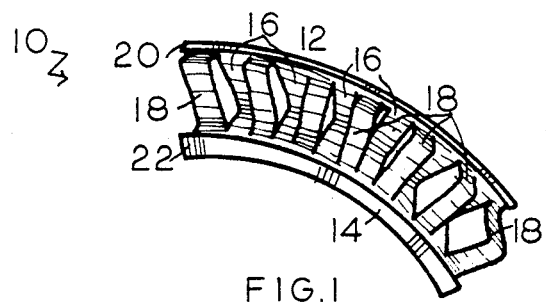
FIG. 1 is a perspective view of a saddle-type random packing element of the invention.
Figure 2:
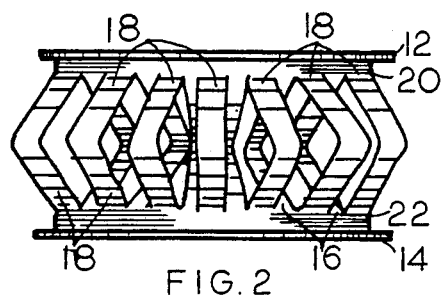
FIG. 2 is a top plan view of the saddle-type random packing element of FIG. 1.
Figure 3:
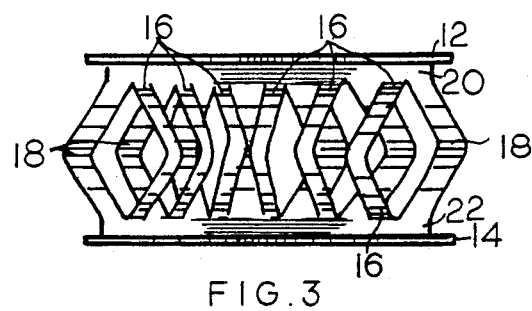
FIG. 3 is a bottom plan view of the saddle-type random packing element of FIG. 1.
Figure 4:
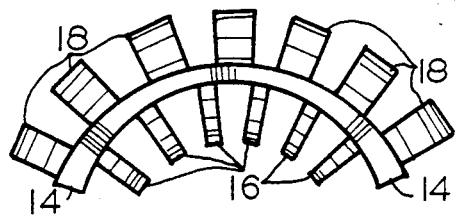
FIG. 4 is a side plan view of the saddle-type random packing element of FIG. 1, the other side being the same.
Figure 5:
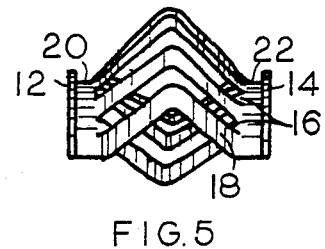
FIG. 5 is an end plan view of the saddle-type random packing element of FIG. 1, the other end being the same.

With reference to FIGS. 1-5 which show a saddle-type random packing element 10 of the invention representing arcuately about 25% to 30% of a radius of two and one-half inches which comprises generally parallel, spaced apart, upright flanges 12 and 14 extending generally perpendicularly to narrow, parallel 20 and 22 trough sections created thereby designed for the passage of liquid therealong. The random packing element 10 has a plurality of parallel lower 16 and upper 18 arched, supporting rib elements, the upper and lower rib elements 16 and 18 generally essentially aligned along the longitudinal axis of the packing 10 with each of the upper and lower rib elements 16 and 18 of the same height and essentially centrally longitudinally disposed with the lower rib elements 16 generally radially disposed and closer together and of lesser width than the upper rib elements 18. The number of rib elements 16 and 18 are six and seven respectively, but vary in number, for example, from four to twelve, such as six to ten. The arched elements 16 and 18 are generally V-shaped and of the same height with the center line of the V longitudinally aligned with the center of the packing.

Figure 6:
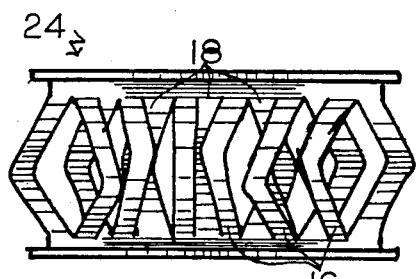
FIG. 6 is a bottom plan view of another embodiment of the random packing of FIG. 1.

FIG. 6 is a bottom plan view of another embodiment of a random packing element 24 wherein the lower arched rib elements 16 are alternately slightly offset or misaligned from the center longitudinal line of the packing element.

Figure 7:
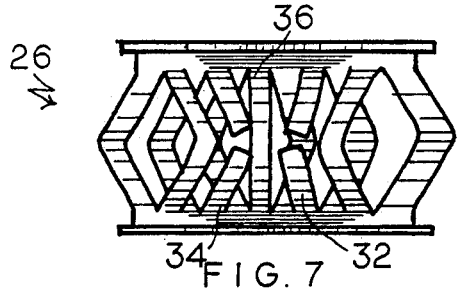
FIG. 7 is a bottom plan view of another further embodiment random packing element of FIG. 1.

FIG. 7 is a bottom plan view of an additional embodiment of a random packing element 26 wherein two rib elements 32 and 34 of the lower arched rib elements 16 have been cut on either side of a central lower arched rib element 36 to provide radially projecting cut portions 32 and 34 on either side thereof. If desired, some or all of the lower rib elements 16 may be cut and bent toward the center of the element.

Figure 8:
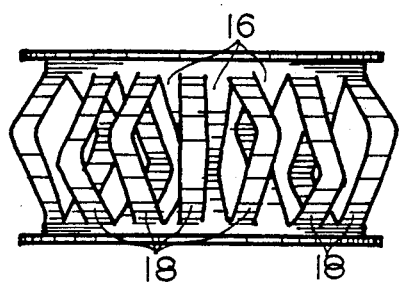
FIG. 8 is a top plan view of an additional embodiment of the random packing element of FIG. 1.
Figure 9:
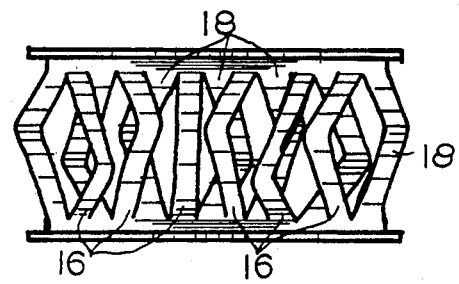
FIG. 9 is a bottom plan view of an additional embodiment of the random packing element of FIG. 1.

FIGS. 8 and 9 are top and bottom plan views of a further embodiment of the random packing element 38 of the invention wherein the upper arched rib elements 18 are alternately offset or misaligned from the central longitudinal axis of the random packing element 38 and wherein also the lower rib elements 16 are alternately offset or are misaligned.

Figure 10:
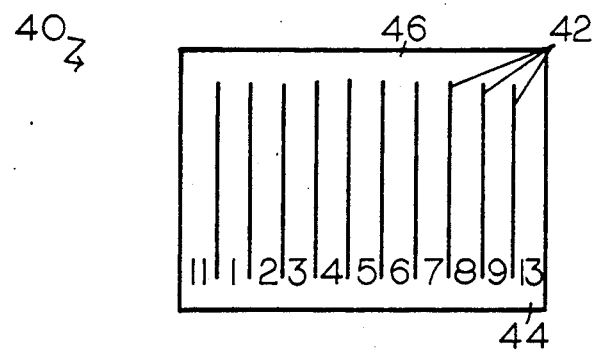
FIG. 10 is a schematic top plan view of a sheet material which has been slit and to be used in the method of manufacture of another embodiment of the random packing element of the invention.

FIG. 10 is a top plan view of a flat, metal, rectangular sheet material 40, having for example a length of 2-1/16 inches, a width of 1-½ inches and showing a plurality of lances or slits in the sheet material to define a plurality of unbent rib elements 1-9, 11 and 13, and with uncut areas 44 and 46 on either side, for example having a diameter of 3/16 inches, with the width of the slits ranging from about 3/16 inches.

Figure 11:
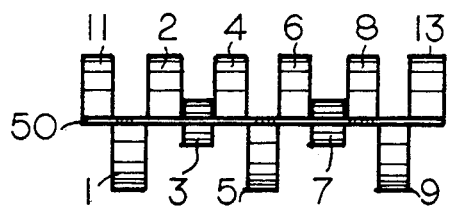
FIG. 11 is a schematic side plan view of the sheet material of FIG. 10 after forming the rib elements.

FIG. 11 is a side plan view of the metal sheet material 40 after the metal sheet material has been bent to form the ribs 1-9, 11 and 13 alternately bent upwardly and downwardly to form inner and outer arched ribs with ribs 3 and 7 bent in a W shape, the sides 44 and 46 of the metal sheet material 40 have been bent upwardly for form parallel, upright flanges 48 and 50.

Figure 12:
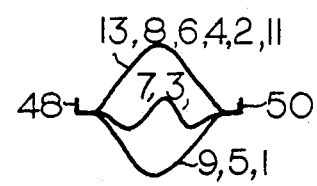
FIG. 12 is a schematic end plan view of the sheet material of FIG. 11.

FIG. 12 is an end plan view of FIG. 11. Inner rib elements 3 and 7 have been bent into a generally W-shape and extend above and below the center between the flanges 48 and 50 and provide more room for the inner rib elements 1, 5 and 9 in the arcuate shape.

Figure 13:
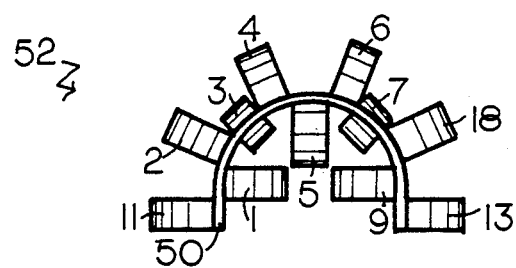
FIG. 13 is a schematic representation of a side plan view of the sheet material shown in FIGS. 11 and 12 after arcuate forming of the random packing element of the invention.

FIG. 13 is a side plan view of the random packing element 52 after the bent device of FIGS. 11 and 12 has been bent into a semicircular-arcuate saddle shape. FIGS. 10-13 illustrate one method of forming the random packing elements of the invention by slitting a flat sheet material 40, bending a plurality of inner and outer arched ribs 1-9, 11 and 13 from the strip material formed by the slitting and bending up the side flanges 48 and 50 (FIGS. 11 and 12) and then bending into a saddle or arcuate form (FIG. 13).

As illustrated and described, the saddle-type random packing element of the invention provides for a packing element which is easily and effectively manufactured at low cost, and yet which provides for high efficiency and good hydraulic capacity with low pressure drop in a gas-liquid tower.

What is claimed is:

1. A saddle-type random packing element for use in a vapor-liquid or liquid-liquid contact column, which packing element comprises:
   a) an arcuate body having first and second, generally parallel, spaced-apart, radially upright, arcuate, longitudinal flange elements on either side of the arcuate body;
   b) a plurality of inner and outer, transverse, arched, generally parallel rib elements extending from and between the first and second arcuate flange elements to define a generally arcuate space within the arcuate body; and
   c) the rib elements extending from the one to the other longitudinal end of the arcuate body, the rib elements alternating between rib elements extending radially outwardly and radially inwardly from the one to the other end of the arcuate body and the width of the inner rib elements of about the same or less width than the width of the outer rib elements.

2. The packing element of claim 1 wherein the upright flange elements and the arcuate body form a first and second troughs on either side of the arcuate body.

3. The packing element of claim 1 wherein the packing element comprises a metal packing element.

4. The packing element of claim 1 wherein the rib elements and flange elements are formed from a sheet material and comprise, substantially the total surface area of the sheet material.

5. The packing element of claim 1 wherein the outer rib elements have a width of about the same or up to 200% greater than the width of the inner rib elements.

6. The packing element of claim 1 wherein the one and the other longitudinal ends of the arcuate body have outer rib elements.

7. The packing element of claim 1 wherein one or more of the inner arched rib elements are non-continuous and extend generally radially inwardly to form drip points.

8. A vapor-liquid or liquid-liquid contact column having a plurality of the random packing elements of claim 1.

9. The packing element of claim 1 wherein the inner and outer arched rib elements have generally V-shaped arched sections longitudinally centrally aligned.

10. The packing element of claim 1 wherein the inner or outer arched rib elements have the arched section generally longitudinal alternately misaligned from the center of the arcuate body.

11. The packing element of claim 1 wherein the outer arched rib elements have the arched section generally longitudinally centrally aligned, the inner arched rib elements have the arched section generally longitudinally alternately misaligned from the center of the arcuate body, and the outer arched rib elements having a width of up to about 200% greater than the width of the inner rib elements.

12. The packing element of claim 1 wherein the outer rib elements are arched in a general uniform V-shape.

13. The packing element of claim 12 wherein the number of inner or outer rib elements ranges from about 3 to 12.

14. The packing element of claim 12 wherein a plurality of the inner rib elements are arched in a general W-shape of less height than the remaining inner arched rib elements.

15. A method of manufacturing a saddle-type random packing element, which method comprises:
   a) forming a plurality of generally parallel slits of defined width in a generally rectangular, flat sheet material, which slits terminate short of the sides of the sheet material to define a plurality of inner and outer, flat rib elements, the formed width of the inner rib elements about the same or less than the formed width of the outer rib elements;
   b) forming the rib elements into a plurality of alternating inner and outer arched rib elements extending from and between the first and second arcuate flange elements to define a generally arcuate space within the arcuate body;
   c) forming the sides of the material into generally short, upright, arcuate, longitudinal flange elements on either side of the sheet material; and
   d) forming the material with the arched rib elements into a generally arcuate shape to provide an arcuate body with the rib elements extending radially outwardly and radially inwardly from the one to the other end of the arcuate body.

16. The method of claim 15 wherein the sheet material is a metal sheet material.

17. The method of claim 15 which includes bending a plurality of the arched section of the inner and outer rib elements to be misaligned from the longitudinal center of the arcuate shape.

18. The method of claim 15 which includes forming the inner and outer arched rib elements with the arched section, generally longitudinally, centrally positioned on the arcuate shape.

19. The method of claim 15 which includes cutting one or more of the inner arched rib elements to form separate, cut sections.

20. The method of claim 15 which includes forming the outer rib elements of up to about 200% greater width than the width of the inner rib elements.

21. The saddle-type random packing element produced by the method of claim 15.

22. The method of claim 15 which includes forming a plurality of the inner and outer rib elements of a generally uniform V-shape.

23. The method of claim 22 which includes forming a plurality of the inner rib elements of a generally W-shape and of a lesser height than the remaining inner rib elements.

24. The method of claim 22 which includes cutting a plurality of the inner rib elements generally centrally of the flat sheet to form inner rib elements with cut ends to form drip points.

25. A saddle-type random packing element for use in a vapor-liquid or liquid-liquid contact column, which packing elements comprises:
   a) an arcuate body having first and second, generally parallel, spaced-apart, radially upright, longitudinal flange elements on either side of the arcuate body;
   b) a plurality of inner and outer, transverse, arched, rib elements extending between the first and second flange elements to define a generally arcuate space within the arcuate body;
   c) the rib elements extending from the one to the other longitudinal end of the arcuate body, the rib elements alternating between rib elements extending radially outwardly and radially inwardly from the one to the other end of the arcuate body; and
   d) wherein the inner or outer or both arched rib elements have the arched section generally longitudinally and alternately misaligned from the center of the arcuate body; and
   e) wherein a plurality of the inner rib elements are arched in a general W-shape.

26. A saddle-type random packing element for use in a vapor-liquid or liquid-liquid contact column, which packing elements comprises:
   a) an arcuate body having first and second, generally parallel, spaced-apart radially upright, longitudinal flange elements or either side of the arcuate body;
   b) a plurality of inner and outer, transverse, arched, rib elements extending between the first and second flange elements to define a generally arcuate space within the arcuate body;
   c) the rib elements extending from the one to the other longitudinal end of the arcuate body, the rib elements alternating between rib elements extending radially outwardly and radially inwardly from the one to the other end of the arcuate body; and
   d) wherein the inner arched rib elements have the arched section generally longitudinally and alternately misaligned; and
   e) wherein the outer arched rid elements have the arched section generally longitudinally aligned; and
   f) wherein the misaligned inner arched rib elements have less width than the width of the aligned outer rib elements.

27. A method of manufacturing a saddle-type random packing element, which method comprises:
   a) forming a plurality of generally parallel slits of defined width in a generally rectangular, flat sheet material, which slits terminate short of the sides of the sheet material to define a plurality of rib elements;
   b) forming the rib elements into a plurality of alternating inner and outer arched rib elements and forming a plurality of the arched sections of the inner or outer ribs or both rib elements to be misaligned from the longitudinal center of the arcuate shape;
   c) forming the sides of the material into generally short, upright, flange elements; and
   d) forming the material with the arched rib elements into a generally arcuate shape.

28. The saddle-type random packing element produced by the method of claim 27.

* * * * *